United States Patent [19]

Reynolds

[11] 4,204,662
[45] May 27, 1980

[54] VALVE FOR CONTROLLING THE FLOW OF FLUIDS IN CONDUITS AND THE LIKE

[76] Inventor: Anthony C. Reynolds, 821 Overbey Dr., Mobile, Ala. 36608

[21] Appl. No.: 23,036

[22] Filed: Mar. 23, 1979

[51] Int. Cl.² ............................................. F16K 1/00
[52] U.S. Cl. ..................................... 251/334; 251/175
[58] Field of Search ....................... 251/175, 203, 334

[56] References Cited

U.S. PATENT DOCUMENTS

| | | | |
|---|---|---|---|
| 3,170,670 | 2/1965 | Johnstone | 251/175 X |
| 3,291,445 | 12/1966 | Lundberg | 251/334 |
| 3,327,993 | 6/1967 | Elchyghyn | 251/334 |
| 3,575,377 | 4/1971 | Carlton | 251/175 X |
| 4,088,301 | 5/1978 | Ehwig | 251/334 |

*Primary Examiner*—Harold W. Weakley

[57] ABSTRACT

Disclosed is a valve for fluids, gases or liquids, in which the closure member of the valve is supported, when in closed position, in such fashion that pressure on the intermediate or central portion of the closure causes the periphery of the closure to move upstream, into contact with seats or seals carried by the valve body. Specifically, the plate, when closed, is forced by the pressure of the fluid being controlled against fulcrum members, these fulcrum members being located closer to the periphery of the closure member than to its center, whereby the net effect of pressure on the plate as a whole is effective to deflect the central portion of the plate downstream while deflecting the peripheral portions of the plate upstream into sealing, seating engagement with the seals or seats carried by the valve body.

3 Claims, 6 Drawing Figures

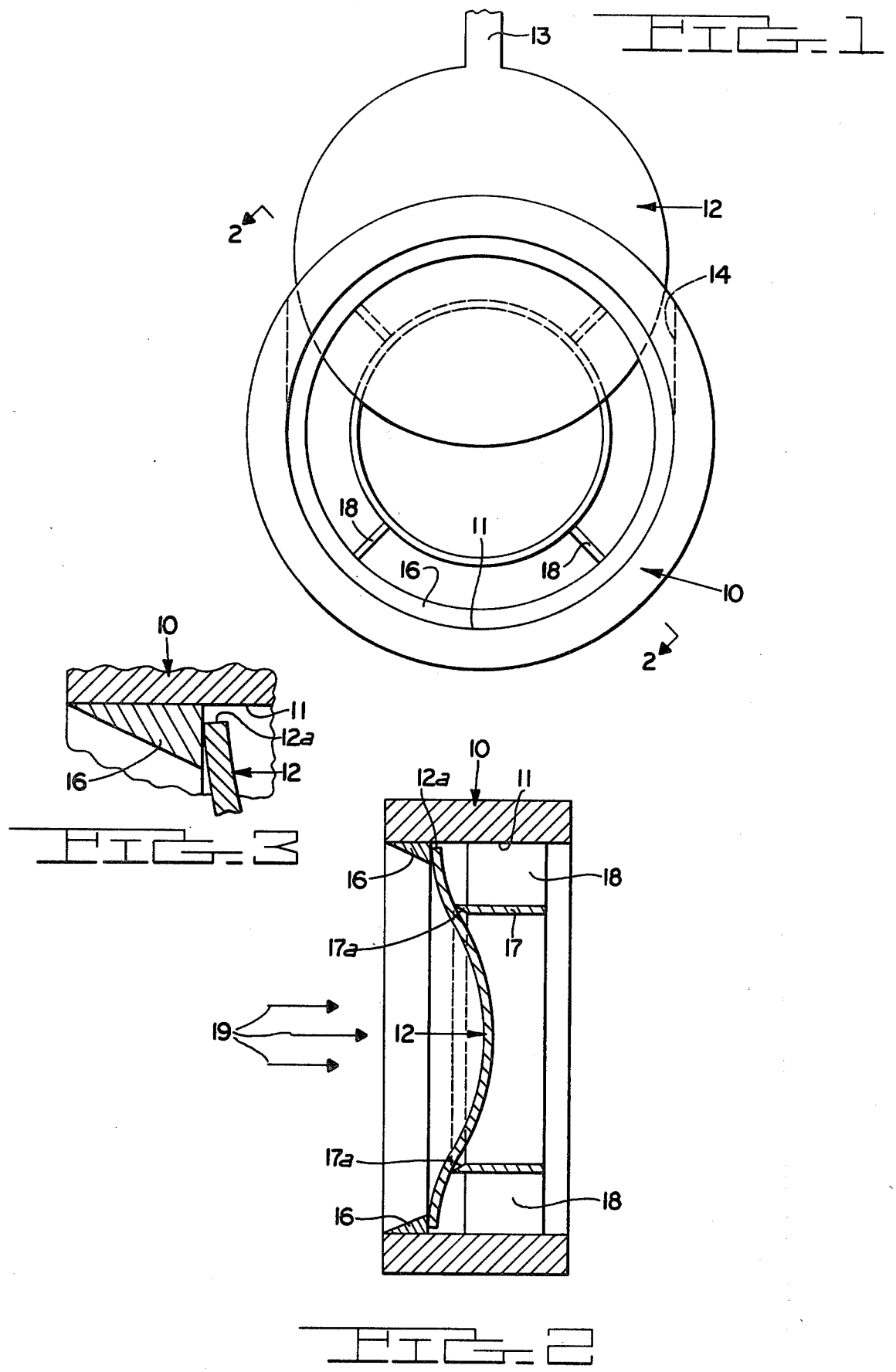

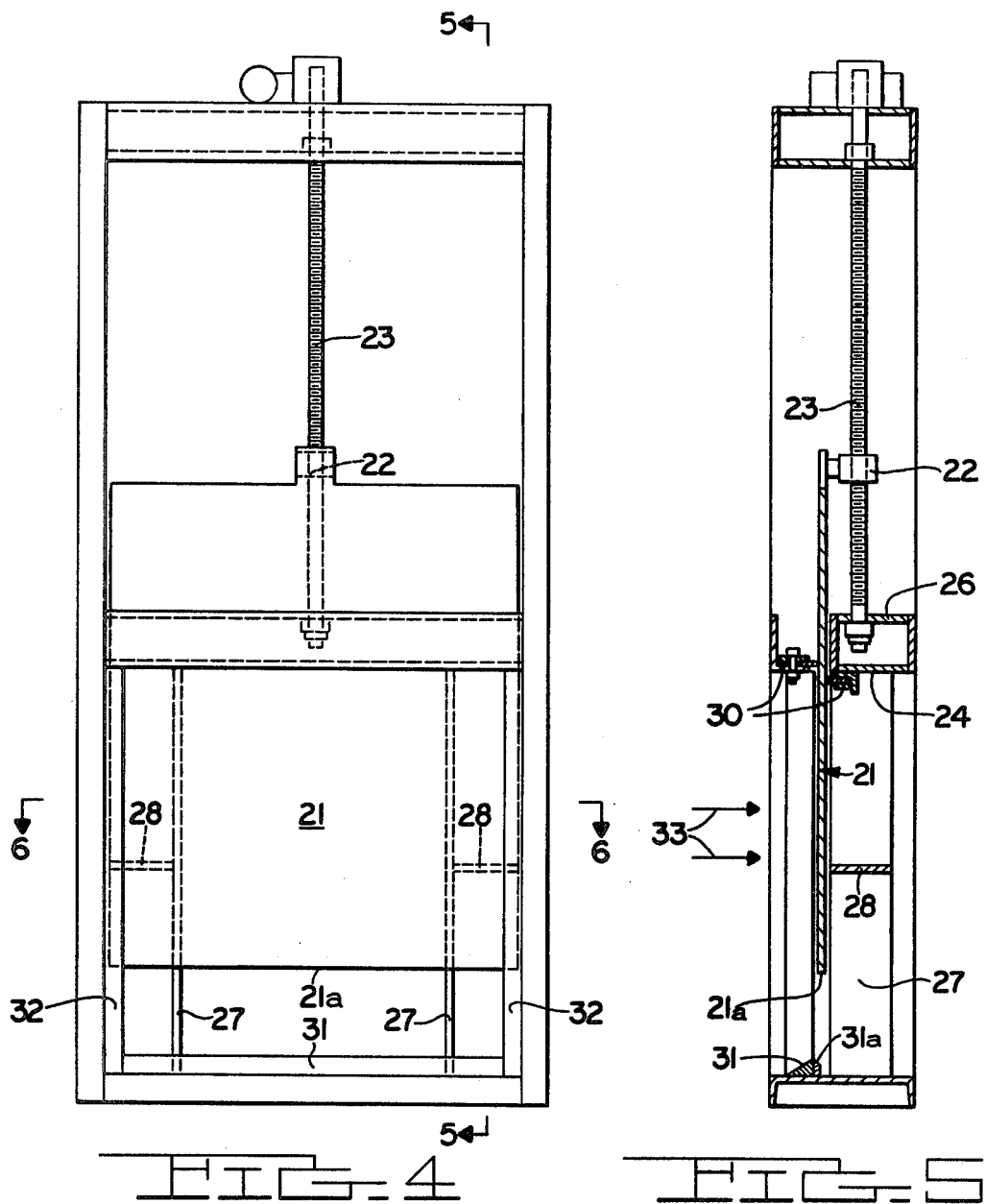
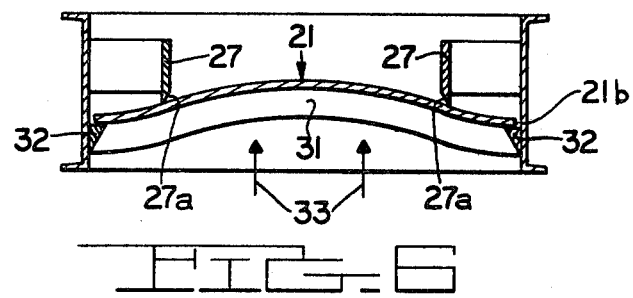

VALVE FOR CONTROLLING THE FLOW OF FLUIDS IN CONDUITS AND THE LIKE

This invention relates to valves for controlling the flow of fluid, either gases or liquids, and has for its object the provision of an improved method of causing the periphery of the closure to engage seats or seals carried by the valve body.

In the art to which my invention relates insofar as I am aware all valves of the moving closure type have seats for the closure arranged downstream of the closure itself. In many installations this is a disadvantage.

My invention contemplates the provision of a valve having the usual body with a fluid passage therethrough. Carried by the body is a seat or seal which may extend around the perimeter of the inside of the fluid passageway. Mounted in the valve body in suitable fashion, and preferably downstream of the closure, is a member or members which act as a fulcrum for the closure member. Specifically, the fulcrum member or members is located in such position relative to the transverse dimensions of the closure that when pressure comes on the closure as a whole the central portion of the closure is deflected slightly downstream, thus causing upstream deflection of the periphery of the closure, bringing the periphery into contact with the seals carried by the valve body. In the case of a circular closure member the fulcrum may be in the form of a length of tube mounted behind or downstream of the closure and carried by the valve body in suitable fashion. In the case of a rectangular or square closure member the fulcrum members may be in the form of plates suitably carried by the interior of the valve body. Seats or seals for the off- operator end of such closure plate may be slightly curved so as to compensate for the deflected curvature of the closure member, when the closure member is completely closed. These seals at the free end of the closure member may be performed, as stated, and may be provided with a slightly tapered upper section which, when the closure member reaches fully closed position causes it to deflect substantially to the position that the pressure causes it to take.

A valve illustrating features of my invention is shown in the accompanying drawings in which:

FIG. 1 is a somewhat diagrammatic view of a valve showing a circular closure member partially inserted into the valve body;

FIG. 2 is a detail sectional view taken generally along line 2—2 of FIG. 1, the deflector of the closure being greatly exaggerated, with the closure member in fully closed position;

FIG. 3 is an enlarged fragmental detail view of one of the seals or seats for the periphery of the closure member;

FIG. 4 is a view of a rectangular plate-type valve, partially open;

FIG. 5 is a detail sectional view taken generally along line 5—5 of FIG. 4; and, FIG. 6 is a detail view taken generally along line 6—6 of FIG. 4 with the closure member shown in deflected position in order to illustrate my invention.

Referring now to the drawings for a better understanding of my invention I show in FIGS. 1-3 inclusive a valve having a body 10 with a fluid passageway 11 therethrough. As illustrated, this is a cylindrical type of valve. The closure member 12 is in the form of a disc and at 13 I illustrate in wholly diagrammatic manner a handle for the disc by means of which the plate may be moved fully into the valve body or removed therefrom. It will be understood that the valve body is provided with a slot 14 through one side permitting passage of the disc 12 into and out of the valve body.

My invention comprises the provision of means responsive to pressure on closure to cause the periphery of the closure 12 to move upstream, into sealing contact with seals 16 carried in the valve body passageway. Thus, I show at 17 a section of a tubular member which is secured in the passageway by means of spider-like plates 18. It will be noted that the cylindrical member is located centrally relative to the passageway and the closure member 12 and is located downstream of the closure member 12.

Referring particularly to FIG. 2 it is now possible to explain the operation and advantages of my improved valve. First, it will be noted that the upstream end of the tubular member 17 may be sharpened as at 17a to provide a circular fulcrum-like section at the upstream end of member 17. With the plate 12 pushed into closing position, and with fluid under pressure applied to the closure as indicated by the arrows 19, the location of the fulcrum member relative to the plate or closure 12 permits the central portion of the disc or closure to deflect downstream. This causes upstream deflection of the periphery 12a of plate 12, causing the periphery to come into sealing contact with the seats or seals 16. It will be understood that in the drawings the deflection of the plate or closure is exaggerated.

It will be seen that by judicious sizing of the diameter of the fulcrum member 17 relative to the disc 12, I can cause varying amounts of pressure to be exerted on the seals and seats 16. That is, by making the area encompassed by the fulcrum member a selected per cent larger than the area lying outside the circle inscribed by the member 17, I get a beam effect on the periphery of the closure disc, when under pressure, which causes its periphery to move upstream into contact with the seats or seals 16.

Referring now to FIGS. 4–6 inclusive, I show my invention as applied to a plate valve having generally a rectangular closure member. Thus, the closure member is indicated at 21 as being a plate-like closure. An operator in the form of a nut 22 and a threaded rod 23 supports the plate 21 for opening and closing motion relative to the fluid passageway 24 of the valve housing 26. The fulcrum members in this case are plates 27 secured to the upper and lower walls of the fluid passageway 24 as indicated.

At the bottom of the opening 24 I may provide a seal 31 for the lower edge 21a of the closure member 21. As shown particularly in FIG. 5, the seal 31 is provided with a downstream tapered section 31a. Furthermore, the seal 31 is curved as indicated in FIG. 6, the curvature of which is greatly exaggerated, so that when the closure member is brought to fully closed position the edge 21a strikes the tapered section 31a, causing the plate to assume generally the contour that it will assume when under pressure. Seals 30 prevent leakage at the top of the valve body.

It will be understood that the valve body is also provided with seats or seals 32 for sealing the vertical sides of the closure member 21. These are located upstream from the closure plate 21.

From the foregoing the operation and advantages of this modification of my invention may now be explained. The location of the fulcrum plates or members 27, relative to the width of the member 21, is fixed so that the major area of the plate lies between the members 27. Therefore, when pressure comes on the valve from the upstream side as indicated by arrows 33, FIG. 6, the plate deflects downstream at its center, thereby causing the side edges 21b to deflect upstream into contact with the seals or seats 32. It will also be noted that the fulcrum members may be sharpened if desired as indicated at 27a.

In view of the foregoing it will be seen that I have devised an improved valve for controlling the flow of fluids, namely, liquids or gases, in which the seals for the closure member may be located upstream of the closure as distinguished from downstream thereof. As stated, there are instances in the use of valves where it is undesirable for the actual seats or seals which are engaged by the closure to be subjected directly or head-on to the flow of the fluid being controlled. It will be seen that with my improved valves that while the seals are upstream of the closures the actual seals are on the downstream side of the projections which carry them or from which they are supported by the valve body.

While I have shown my invention in two forms, it will be obvious to those skilled in the art that it is not so limited, but is susceptible of various other changes and modifications without departing from the spirit thereof.

What I claim is:

1. In a valve having a body and a passageway therethrough for flow of fluid to be controlled,
   (a) a closure in the form of a plate-like member,
   (b) seals for the periphery of the closure carried by the valve body and located upstream from the closure member, and
   (c) means associated with the valve body located in position for a portion of the closure intermediate its center and periphery to contact the same, whereby when under pressure downstream deflection of the central portion of the closure results in upstream deflection of the peripheral portion of the closure, causing the peripheral portion to come into sealing contact with said seals.

2. In a valve having a body and a passageway therethrough for flow of fluid to be controlled,
   (a) a closure in the form of a plate-like member,
   (b) seals for the periphery of the closure carried by the valve body and located upstream from the periphery of the closure member, and
   (c) a fulcrum member against which the downstream side of the closure is forced by the pressure of the fluid being controlled, said fulcrum member being located in position for the central portion of the closure, when under pressure, to deflect downstream relative to the fulcrum member, thereby deflecting the periphery of the closure upstream and into sealing contact with said seals.

3. A valve as defined in claim 2 in which the passageway through the valve body is cylindrical, said closure member being generally in the shape of a disc of a size to close the passageway when in shut-off position, said fulcrum being generally annular in shape with an outer diameter less than the diameter of said disc, and located generally concentrically relative to the disc.

* * * * *